(12) United States Patent
Wu et al.

(10) Patent No.: US 10,606,154 B2
(45) Date of Patent: Mar. 31, 2020

(54) PROJECTION LENS STRUCTURE

(71) Applicant: SUN YANG OPTICS DEVELOPMENT CO., LTD., Taoyuan (TW)

(72) Inventors: Sheng-Che Wu, Taoyuan (TW); Yu-Hung Chou, Taoyuan (TW); You-Da Chen, Taoyuan (TW)

(73) Assignee: Sun Yang Optics Development Co., Ltd., Taoyuan (TW)

( * ) Notice: Subject to any disclaimer, the term of this patent is extended or adjusted under 35 U.S.C. 154(b) by 17 days.

(21) Appl. No.: 16/121,870

(22) Filed: Sep. 5, 2018

(65) Prior Publication Data

US 2020/0073216 A1 Mar. 5, 2020

(51) Int. Cl.
| | | |
|---|---|---|
| *G03B 21/14* | (2006.01) | |
| *G02B 9/64* | (2006.01) | |
| *G02B 27/09* | (2006.01) | |
| *H04N 9/31* | (2006.01) | |
| *G02B 27/00* | (2006.01) | |
| *G02B 7/04* | (2006.01) | |

(52) U.S. Cl.
CPC ............. *G03B 21/147* (2013.01); *G02B 7/04* (2013.01); *G02B 9/64* (2013.01); *G02B 27/0037* (2013.01); *G02B 27/0955* (2013.01); *H04N 9/31* (2013.01)

(58) Field of Classification Search
CPC .......... G03B 21/147; G02B 7/04; G02B 9/64; G02B 27/0037; G02B 27/0955; H04N 9/31
USPC ........................................................ 353/101
See application file for complete search history.

(56) References Cited

U.S. PATENT DOCUMENTS

2016/0377844 A1* 12/2016 Cheng ................. G02B 13/143
359/355

* cited by examiner

Primary Examiner — Jerry L Brooks
(74) Attorney, Agent, or Firm — Rosenberg, Klein & Lee

(57) ABSTRACT

A projection lens structure includes a first group of lens, an aperture stop and a second group of lend. The aperture stop is arranged at a rear of the first group of lens to form a long-focus lens with a focal length between 30-80 mm and the second group of lens is arranged at a rear of the aperture stop to form a short-focus lens with a focal length between 20-30 mm. With the long-focus lens and the short-focus lens operated correspondingly, the structure of the projection lens is simple and the manufacturing cost is low without affecting the quality of produced images.

10 Claims, 12 Drawing Sheets

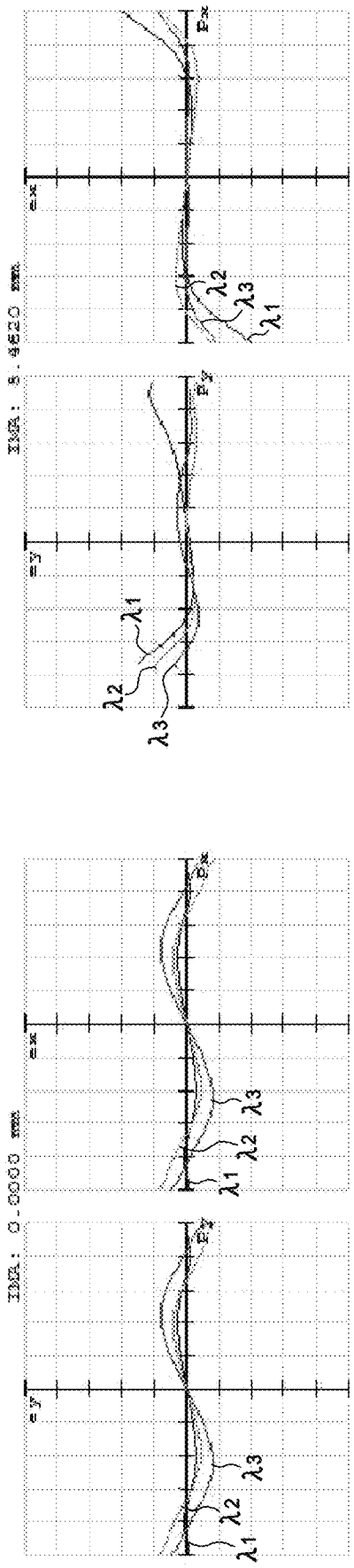
FIG.1B
FIG.1C
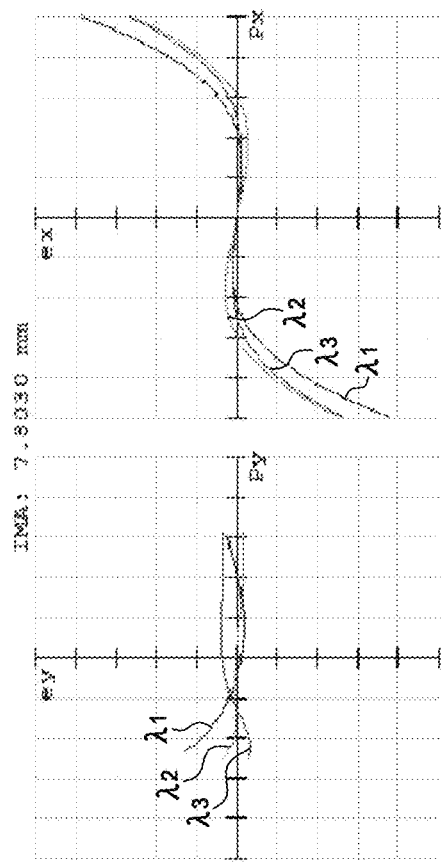
FIG.1D

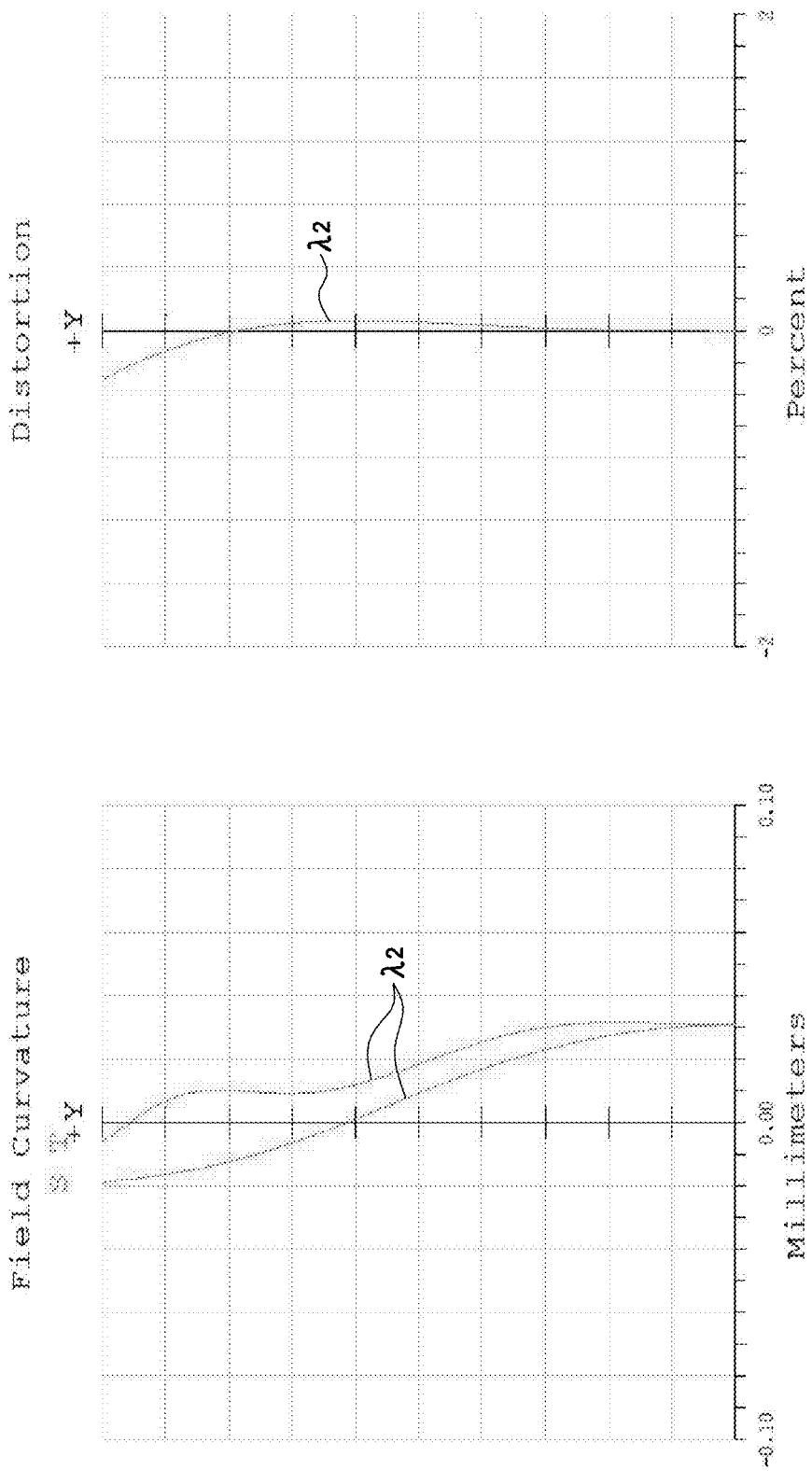

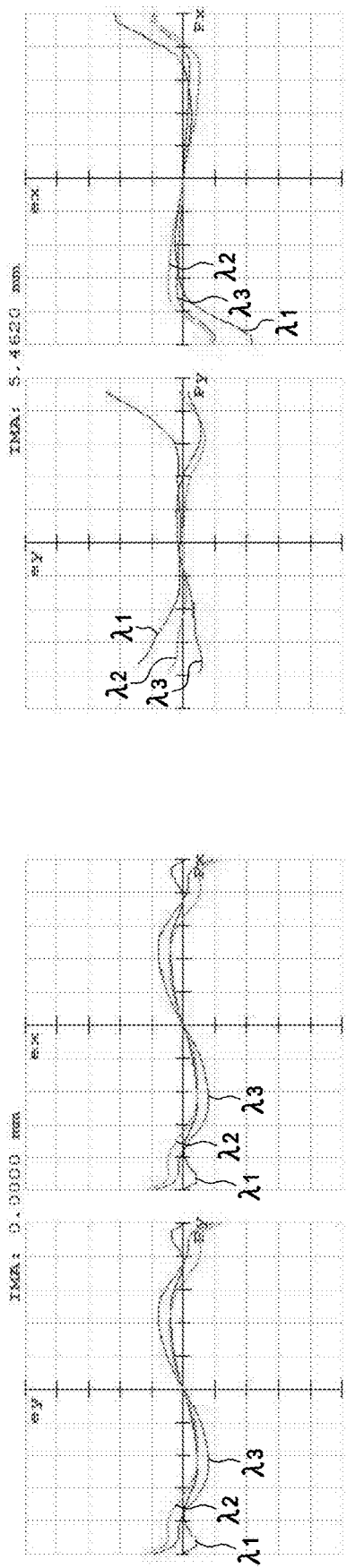

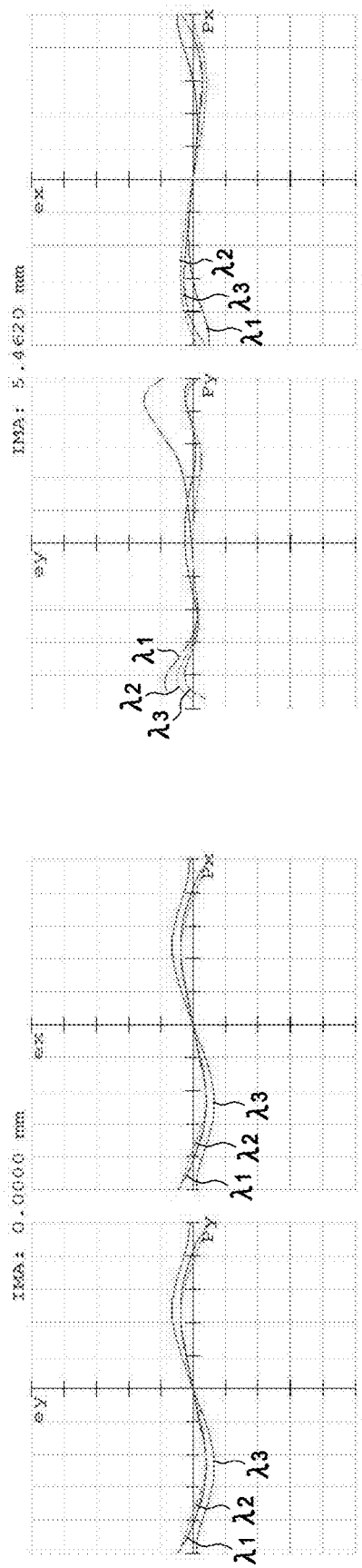
FIG.3B
FIG.3C
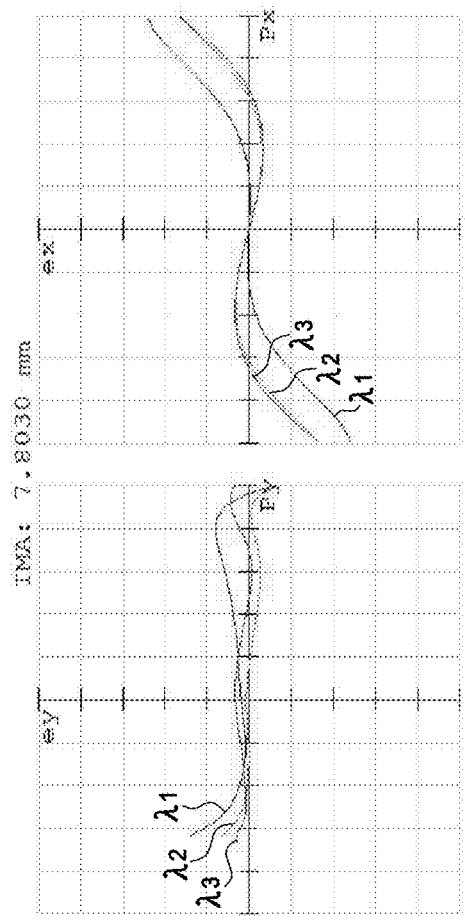
FIG.3D

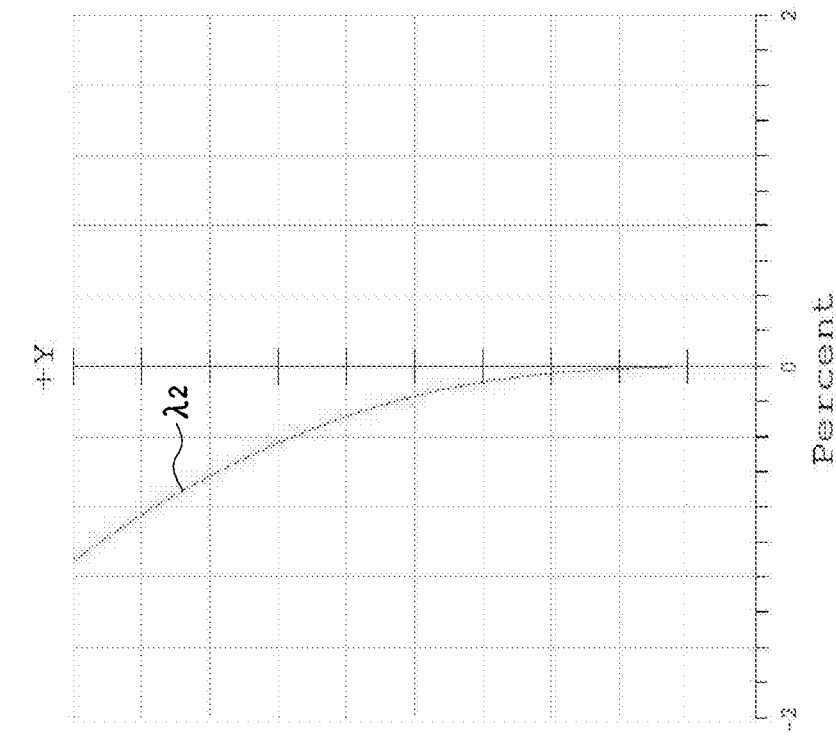
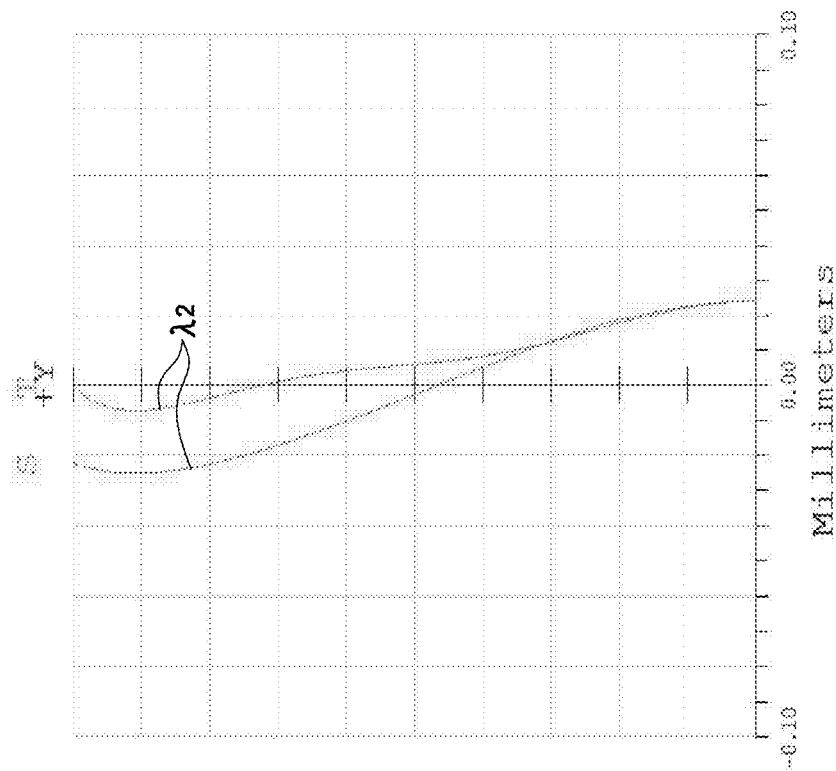
FIG.3E
FIG.3F

PROJECTION LENS STRUCTURE

BACKGROUND OF THE INVENTION

1. Field of the Invention

The present invention relates to a projection lens structure, particularly to one that has a long-focus lens and a short-focus lens operated together to manufacture the projection lens with simple structure and low costs.

2. Description of the Related Art

As technologies developed, applications of projectors have been expanded from presentations in the offices to video communications and TV programs displays in household families, and the volume of the projectors is more and more important when it comes to easy carrying for use. Therefore, simpler structures and less manufacturing cost come together as the volume of projectors are reduced. However, the quality of the projected images is also reduced as well.

In view of the quality of the projected images, the longer the focal lengths are, the narrower the angle of the field of view the projectors have, and as the focal lengths become shorter, the distortion of the images gets worse. So it is impossible to guarantee the quality of the images with the focal lengths reduced. Therefore, it is desirable to make an arrangement of the structures of the projectors to achieve greater efficiency in projections by adjustment of the focal lengths while ensuring the quality of the projected images.

SUMMARY OF THE INVENTION

A primary objective of the present invention is to provide a projection lens structure that has a short-focus lens and a long-focus lens coordinated in operation to produce images with fine quality by a simple structure and low manufacturing cost.

Another objective of the present invention is to provide a projection lens structure that has a short-focus lens and a long-focus lens operated correspondingly with a large aperture stop to enhance quality of the images.

To achieve the objectives mentioned above, the present invention comprises a first group of lens; an aperture stop arranged at a rear side of said first group of lens, forming a long-focus lens with a focal length between 30~80 mm; and a second group of lens arranged at a rear side of said aperture stop, forming a short-focus lens with a focal length between 20~30 mm.

Furthermore, the first group of lens includes a first lens, a second lens, a third lens and a fourth lens, among which the second and fourth lenses are plastic aspheric lenses. The second lens is a negative meniscus lens with a focal length between −20~−50 mm or a focal length between −25~−40 mm. The fourth lens is a meniscus lens with a focal length longer than 300 mm when being positive or shorter than −300 mm when being negative. The first lens has an abbe number greater than 60.

In addition, the second group of lens includes at least one triplet lens having dioptric values arranged as positive-negative-positive or negative-positive-negative and the triplet lens further includes a fifth lens, a sixth lens and a seventh lens. The second group of lens further includes an eighth lens arranged at a rear side of the triplet lens, and at least two of the fifth, sixth, seventh and eighth lens have an abbe number greater than 60.

Moreover, the second group lens further includes a last lens with an abbe number less than 25. The aperture stop has an f-number between 1.6~2.0.

The first group of lens includes a first lens, a second lens, a third lens and a fourth lens among which the second and third lenses are plastic aspheric lenses; the third lens is a meniscus lens with a focal length longer than 300 mm when being positive or shorter than −300 mm when being negative.

Still, to achieve the objectives, another structure of the present invention comprises a first group of lens including a first lens, a second lens, a third lens and a fourth lens, said second being negative and being a plastic aspheric lens in a meniscus shape with a focal length between −25~−50 mm; an aperture stop having an f-number between 1.6~2.0 and arranged at a rear side of said first group of lens, forming a long-focus lens with a focal length between 30~80 mm; and a second group of lens including at least one triplet lens, an eighth lens and a last lens and arranged at a rear side of said aperture stop, forming a short-focus lens with a focal length between 20~30 mm, said triplet lens having dioptric values arranged as positive-negative-positive or negative-positive-negative and including a fifth lens, a sixth lens and a seventh lens, at least two of the fifth, sixth, seventh and eighth lens having an abbe number greater than 60 and said last lens having an abbe number less than 25.

With structures disclosed above, the present invention has the short-focus lens and long-focus lens operated correspondingly to manufacture a projection lens with simple structure and low cost; meanwhile, the quality of produced images can also be enhanced with the aperture stop arranged between the long-focus lens and the short-focus lens.

BRIEF DESCRIPTION OF THE DRAWINGS

FIG. 1B is a transverse ray fan plot with an image height of 0.0000 mm according to the present invention in the first embodiment;

FIG. 1C is a transverse ray fan plot with an image height of 5.4620 mm according to the present invention in the first embodiment;

FIG. 1D is a transverse ray fan plot with an image height of 7.8030 mm according to the present invention in the first embodiment;

FIG. 1E is a field curvature diagram of the present invention in the first embodiment;

FIG. 1F is a distortion diagram of the present invention in the first embodiment;

FIG. 2B is a transverse ray fan plot with an image height of 0.0000 mm according to the present invention in the second embodiment;

FIG. 2C is a transverse ray fan plot with an image height of 5.4620 mm according to the present invention in the second embodiment;

FIG. 2D is a transverse ray fan plot with an image height of 7.8030 mm according to the present invention in the second embodiment;

FIG. 3B is a transverse ray fan plot with an image height of 0.0000 mm according to the present invention in the third embodiment;

FIG. 3C is a transverse ray fan plot with an image height of 5.4620 mm according to the present invention in the third embodiment;

FIG. 3D is a transverse ray fan plot with an image height of 7.8030 mm according to the present invention in the third embodiment;

FIG. 3E is a field curvature diagram of the present invention in the third embodiment;

FIG. 3F is a distortion diagram of the present invention in the third embodiment;

DETAILED DESCRIPTION OF THE PREFERRED EMBODIMENT

In FIGS. 1A-3I, there are three embodiments of the present invention. In the embodiments, a projection lens structure mainly comprises a first group of lens $G_1$, an aperture stop S, a second group of lens $G_2$.

The first group of lens $G_1$ includes a first lens $L_1$, a second lens $L_2$, a third lens $L_3$ and a fourth lens $L_4$. The second lens $L_2$ is a negative meniscus lens with a focal length between −20~−50 mm, or a focal length between −25~−40 mm in another preferred embodiment.

The aperture stop S has an f-number between 1.6~2.0 and is arranged at a rear side of the first group of lens $G_1$, forming a long-focus lens 10 from the first group of lens $G_1$ to the aperture stop S with a focal length between 30~80 mm; in other words, the long-focus lens 10 is near the projection screen in operation.

The second group of lens $G_2$ includes at least one triplet lens C, an eighth lens $L_8$ and a last lens $L_9$. The triplet lens C has dioptric values arranged as positive-negative-positive or negative-positive-negative and includes a fifth lens $L_5$, a sixth lens $L_6$ and a seventh lens $L_7$, at least two of which have an abbe number greater than 60, and the last lens $L_9$ has an abbe number less than 25. The second group of lens $G_2$ is arranged at a rear side of the aperture stop S, forming a short-focus lens 20 from the aperture stop S to the second group of lens $G_2$ with a focal length between 20~30 mm.

Furthermore, a transmissive smooth picture actuator P is disposed at a rear side of the last lens $L_9$. The transmissive smooth picture actuator P is a glass tablet device which is able to rotate rapidly to enhance the resolution by image-shifts. In this way, an image with 1080P resolution can be enhanced to 4K2K resolution. An optical element E is disposed at a rear of the transmissive smooth picture actuator P. In this embodiment, the optical element E is a prism, and a cover glass and an image IMA of a digital micromirror device 30 are disposed behind the prism; but the present invention is not limited to this application. The structures above are common features shared in the three embodiments.

Figure 1A:
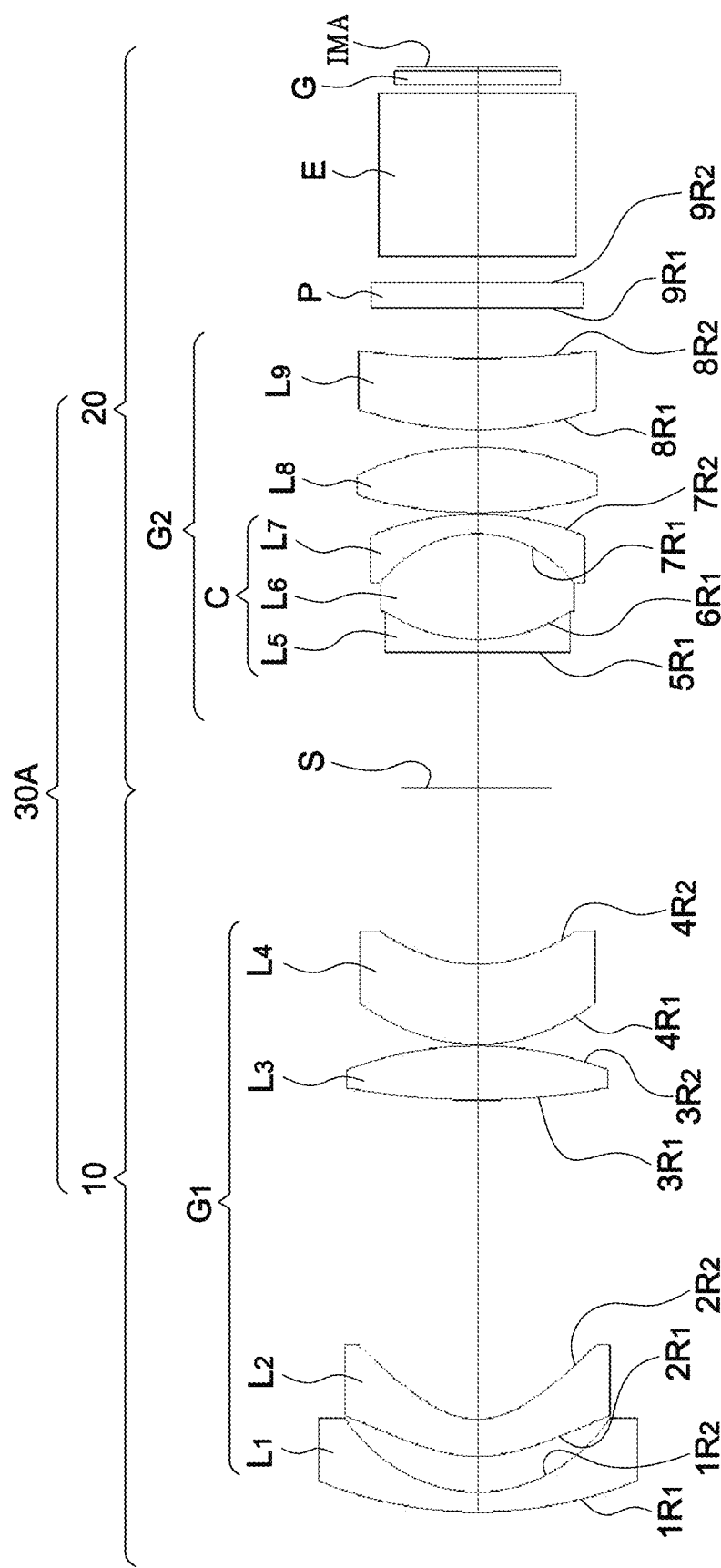
FIG. 1A is a schematic diagram illustrating lenses arrangement of the present invention in a first embodiment.

Further referring to FIG. 1A, in the first embodiment the first lens $L_1$, the second lens $L_2$, the third lens $L_3$, the fourth lens $L_4$, the fifth lens $L_5$, a sixth lens $L_6$, a seventh lens $L_7$, the eighth lens $L_8$ and the last lens $L_9$ of the projection lens 30A each has a radius on each surface, a thickness, refraction rate and an abbe number according to the following specification:

| Surface no. | Radius (mm) | Thickness (mm) | Refraction rate | Abbe number |
|---|---|---|---|---|
| $1R_1$ | 48.65 | 1.60 | 1.62 | 63.4 |
| $1R_2$ | 16.83 | | | |
| $2R_1$ | 15.81 | 3.00 | 1.53 | 56.3 |
| $2R_2$ | 8.29 | | | |
| $3R_1$ | 79.46 | 4.39 | 1.77 | 49.6 |
| $3R_2$ | −42.14 | | | |
| $4R_1$ | 19.89 | 6.50 | 1.53 | 56.3 |
| $4R_2$ | 17.22 | | | |
| S | Infinity | | | |
| $5R_1$ | Infinity | 1.00 | 1.72 | 29.5 |
| $6R_1$ | 18.64 | 8.57 | 1.49 | 81.6 |
| $7R_1$ | −13.06 | 1.58 | 1.72 | 29.5 |
| $7R_2$ | −31.30 | | | |
| $8R_1$ | 47.77 | 5.33 | 1.49 | 81.6 |
| $8R_2$ | −30.56 | | | |
| $9R_1$ | 40.40 | 5.80 | 1.92 | 18.90 |
| $9R_2$ | 110.92 | | | |

In the table above, the $1R_1$ is the projecting surface of the first lens $L_1$ and the $1R_2$ is the image inputting surface of the first lens $L_1$. The $2R_1$ is the projecting surface of the second lens $L_2$ and the $2R_2$ is the image inputting surface of the second lens $L_2$. The $3R_1$ is the projecting surface of the third lens $L_3$ and the $3R_2$ is the image inputting surface of the third lens $L_3$. The $4R_1$ is the projecting surface of the fourth lens $L_4$ and the $4R_2$ is the image inputting surface of the fourth lens $L_4$. The $5R_1$ is the projecting surface of the fifth lens $L_5$. The $6R_1$ is the projecting surface of the sixth lens $L_6$. The $7R_1$ is the projecting surface of the seventh lens $L_7$ and the $7R_2$ is the image inputting surface of the seventh lens $L_7$. The $8R_1$ is the projecting surface of the eighth lens $L_8$ and the $8R_2$ is the image inputting surface of the eighth lens $L_8$. The $9R_1$ is the projecting surface of the last lens $L_9$ and the $9R_2$ is the image inputting surface of the last lens $L_9$.

In addition, the following table displays the radius, the conic value and order aspheric coefficients of the projecting surface $2R_1$ and the image inputting surface $2R_2$ of the second lens $L_2$ as a plastic aspheric lens.

| Aspheric lens | $2R_1$ | $2R_2$ |
| --- | --- | --- |
| Radius | 15.81 | 8.29 |
| Conic | — | −0.83 |
| 4th | −1.57E−04 | −2.03E−04 |
| 6th | 5.84E−07 | 7.29E−07 |
| 8th | −3.41E−09 | −4.44E−09 |
| 10th | 1.08E−11 | 1.33E−11 |
| 12th | −2.20E−14 | −1.55E−14 |

In addition, the following table displays the radius, the conic value and order aspheric coefficients of the projecting surface $4R_1$ and the image inputting surface $4R_2$ of the fourth lens $L_4$ as a plastic aspheric lens.

| Aspheric lens | $4R_1$ | $4R_2$ |
| --- | --- | --- |
| Radius | 19.89 | 17.22 |
| Conic | 0.04 | 0.98 |
| 4th | −8.38E−06 | −3.31E−05 |
| 6th | −2.36E−08 | −1.71E−07 |
| 8th | −4.08E−10 | −2.00E−09 |
| 10th | 2.07E−14 | 1.32E−11 |
| 12th | −8.06E−15 | −1.29E−13 |

In this embodiment, the fourth lens $L_4$ is a meniscus lens with a focal length longer than 300 mm when being positive or shorter than −300 mm when being negative, and the first lens $L_1$ has an abbe number greater than 60. But the present invention is not limited to such application.

Figure 1H:
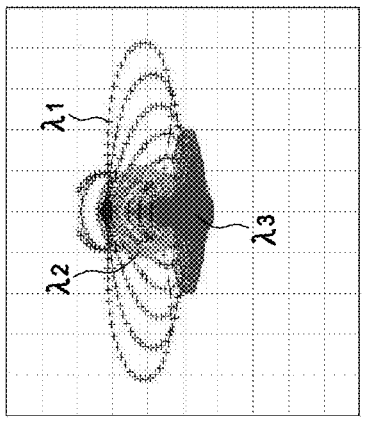
FIG. 1H is a spot diagram with an image height of 5.462 mm according to the present invention in the first embodiment.
Figure 1G:
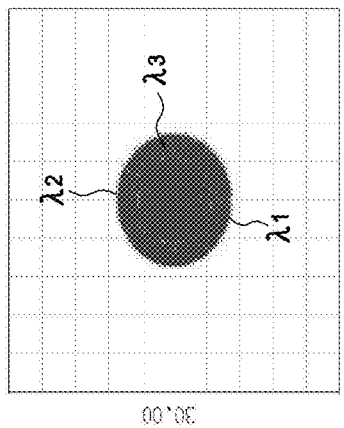
FIG. 1G is a spot diagram with an image height of 0.000 mm according to the present invention in the first embodiment.
Figure 1I:
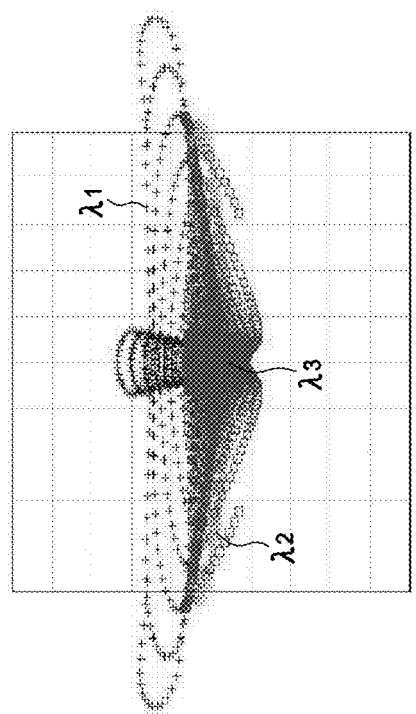
FIG. 1I is a spot diagram with an image height of 7.804 mm according to the present invention in the first embodiment.

With structures disclosed above, the projection lens 30A has a first wavelength $\lambda_1$ set as 0.460 um, a second wavelength $\lambda_2$ set as 0.545 um and a third wavelength $\lambda_3$ set as 0.620 um; thereby it is able to simulate different transverse ray fan plots as shown in FIGS. 1B-1D and to display images with respective image heights of 0.0000 mm, 5.4620 mm and 7.8030 mm on the image IMA. The transverse aberration of a Y-axis is represented by ey. The pupil height of the Y-axis is represented by py. The transverse aberration of an X-axis is represented by ex. The pupil height of the X-axis is represented by px. The maximum of the transverse aberration of the X-axis and the Y-axis is ±20.000 um and the pupil heights of the X-axis and the Y-axis are in normalized proportion; a maximum field of FIGS. 1E and 1F is 31.786°. FIGS. 1G, 1H and 1I are spot diagrams with different image heights displayed on the image IMA. When the image height is 0.000 mm, the root mean square radius is 2.578 um and the geo radius is 5.051 um. When the image height is 5.462 mm, the root mean square radius is 2.636 um and the geo radius is 12.865 um. When the image height is 7.804 mm, the root mean square radius is 4.563 um and the geo radius is 22.942 um. From the data above we can learn that the projection lens 30A has a simple structure and requires low costs for manufacturing with fine image quality.

Figure 2A:
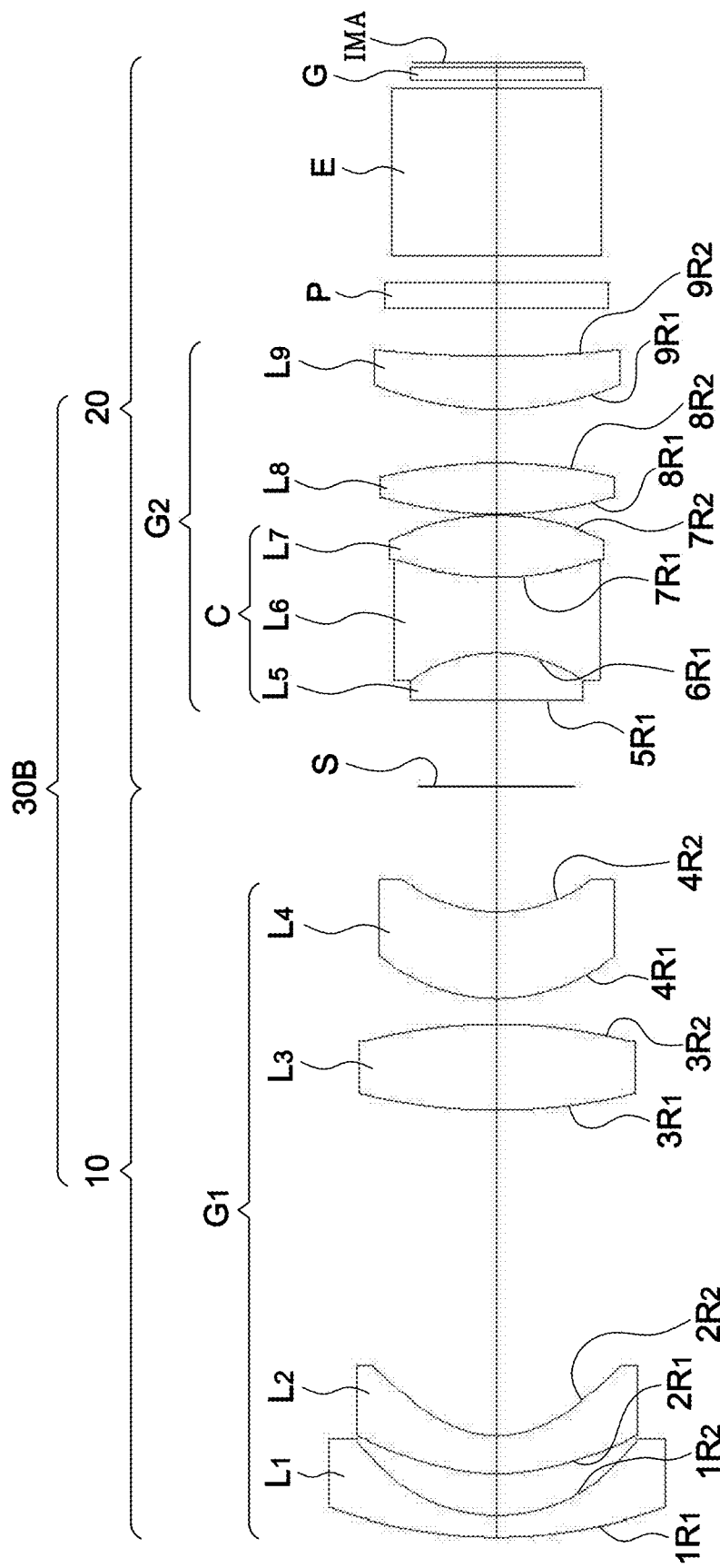
FIG. 2A is a schematic diagram illustrating lenses arrangement of the present invention in a second embodiment.

Further referring to FIG. 2A, in the first embodiment the first lens $L_1$, the second lens $L_2$, the third lens $L_3$, the fourth lens $L_4$, the fifth lens $L_5$, a sixth lens $L_6$, a seventh lens $L_7$, the eighth lens $L_8$ and the last lens $L_9$ of the projection lens 30B each has a radius on each surface, a thickness, refraction rate and an abbe number according to the following specification:

| Surface no. | Radius (mm) | Thickness (mm) | Refraction rate | Abbe number |
| --- | --- | --- | --- | --- |
| $1R_1$ | 51.46 | 1.70 | 1.61 | 63.3 |
| $1R_2$ | 16.79 | | | |
| $2R_1$ | 20.83 | 3.00 | 1.53 | 56.3 |
| $2R_2$ | 9.82 | | | |
| $3R_1$ | 59.89 | 6.84 | 1.83 | 42.7 |
| $3R_2$ | −54.01 | | | |
| $4R_1$ | 18.24 | 6.90 | 1.53 | 56.3 |
| $4R_2$ | 15.65 | | | |
| S | Infinity | | | |
| $5R_1$ | 566.05 | 3.79 | 1.49 | 81.6 |
| $6R_1$ | −15.24 | 6.00 | 1.80 | 25.4 |
| $7R_1$ | 32.82 | 4.87 | 1.49 | 81.6 |
| $7R_2$ | −25.83 | | | |
| $8R_1$ | 41.17 | 4.09 | 1.49 | 81.6 |
| $8R_2$ | −50.52 | | | |
| $9R_1$ | 32.84 | 4.24 | 1.92 | 18.90 |
| $9R_2$ | 118.74 | | | |

In the table above, the $1R_1$ is the projecting surface of the first lens $L_1$ and the $1R_2$ is the image inputting surface of the first lens $L_1$. The $2R_1$ is the projecting surface of the second lens $L_2$ and the $2R_2$ is the image inputting surface of the second lens $L_2$. The $3R_1$ is the projecting surface of the third lens $L_3$ and the $3R_2$ is the image inputting surface of the third lens $L_3$. The $4R_1$ is the projecting surface of the fourth lens $L_4$ and the $4R_2$ is the image inputting surface of the fourth lens $L_4$. The $5R_1$ is the projecting surface of the fifth lens $L_5$. The $6R_1$ is the projecting surface of the sixth lens $L_6$. The $7R_1$ is the projecting surface of the seventh lens $L_7$ and the $7R_2$ is the image inputting surface of the seventh lens $L_7$. The $8R_1$ is the projecting surface of the eighth lens $L_8$ and the $8R_2$ is the image inputting surface of the eighth lens $L_8$. The $9R_1$ is the projecting surface of the last lens $L_9$ and the $9R_2$ is the image inputting surface of the last lens $L_9$.

In addition, the following table displays the radius, the conic value and order aspheric coefficients of the projecting surface $2R_1$ and the image inputting surface $2R_2$ of the second lens $L_2$ as a plastic aspheric lens.

| Aspheric lens | $2R_1$ | $2R_2$ |
| --- | --- | --- |
| Radius | 20.83 | 9.82 |
| Conic | −6.57 | −0.89 |
| 4th | −1.12E−05 | −1.31E−04 |
| 6th | 3.08E−07 | 1.04E−06 |
| 8th | −2.31E−09 | −8.61E−09 |
| 10th | 8.54E−12 | 3.90E−11 |
| 12th | −1.13E−14 | −7.84E−14 |
| 14th | −6.40E−18 | 0.00E+00 |

In addition, the following table displays the radius, the conic value and order aspheric coefficients of the projecting surface $4R_1$ and the image inputting surface $4R_2$ of the fourth lens $L_4$ as a plastic aspheric lens.

| Aspheric lens | $4R_1$ | $4R_2$ |
| --- | --- | --- |
| Radius | 18.24 | 15.65 |
| Conic | 0.39 | 1.19 |
| 4th | −1.67E−05 | −5.36E−05 |
| 6th | −1.97E−08 | −5.14E−08 |
| 8th | −9.33E−10 | −1.13E−08 |
| 10th | 6.06E−12 | 1.42E−10 |
| 12th | −2.67E−14 | −1.10E−12 |

In this embodiment, the fourth lens $L_4$ is a meniscus lens with a focal length longer than 300 mm when being positive or shorter than −300 mm when being negative, and the first lens $L_1$ has an abbe number greater than 60. The second group of lens $G_2$ includes at least one triplet lens C having dioptric values arranged as positive-negative-positive. But the present invention is not limited to such application.

Figure 2F:
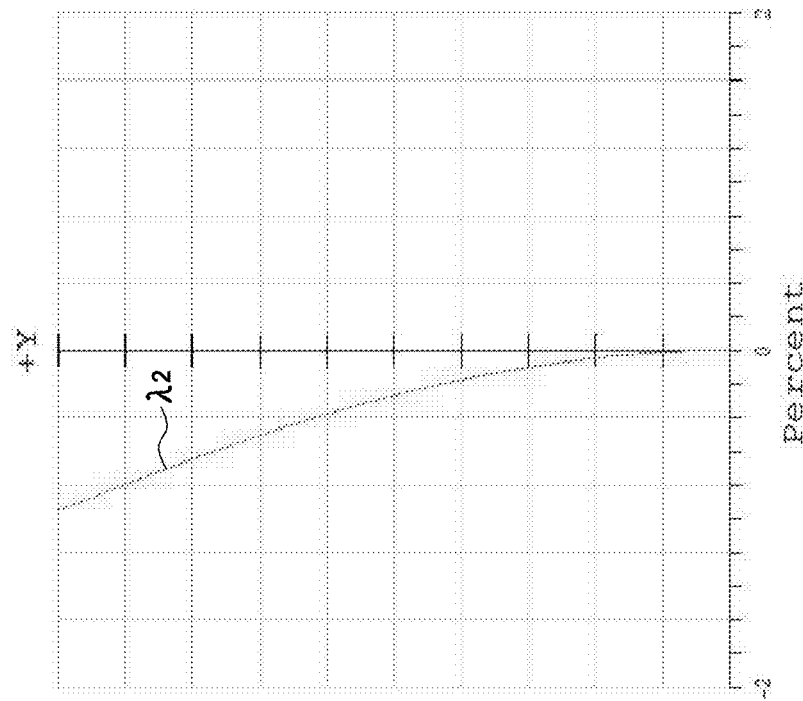
FIG. 2F is a distortion diagram of the present invention in the second embodiment.
Figure 2E:
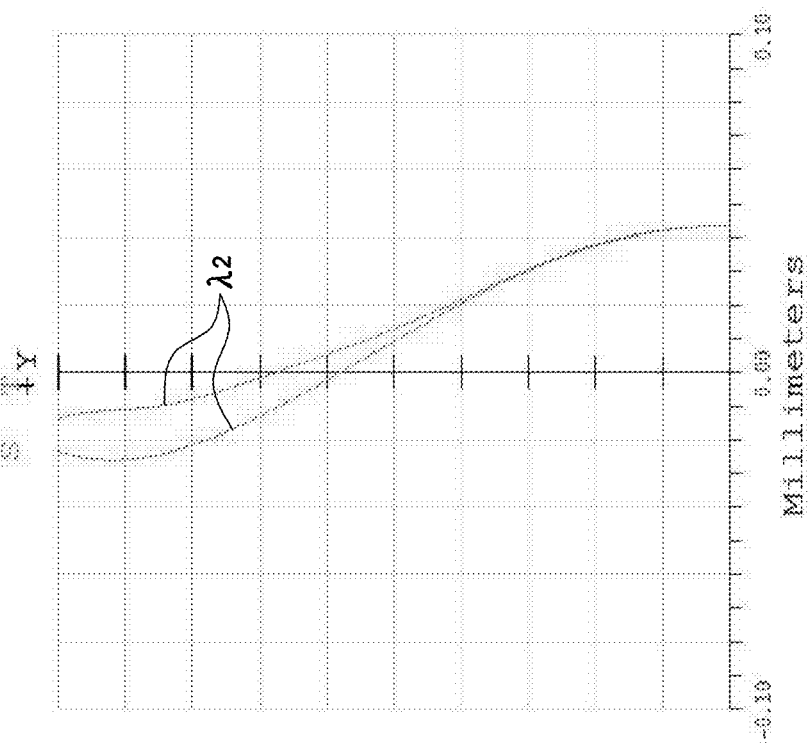
FIG. 2E is a field curvature diagram of the present invention in the second embodiment.
Figure 2H:
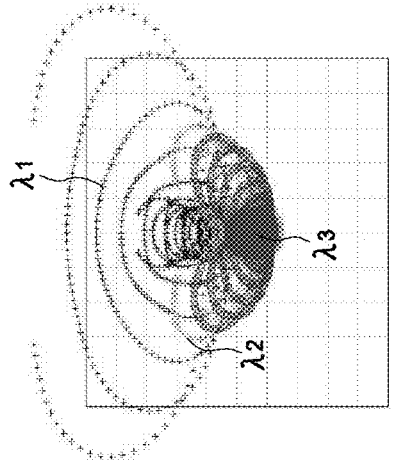
FIG. 2H is a spot diagram with an image height of 5.462 mm according to the present invention in the second embodiment.
Figure 2G:
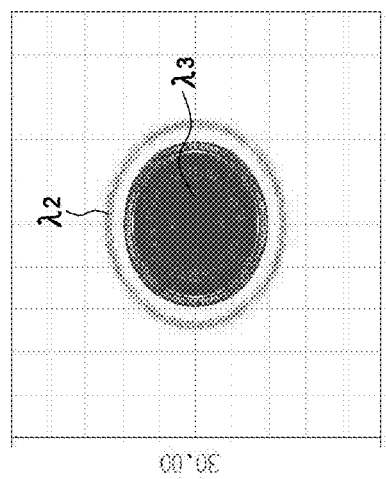
FIG. 2G is a spot diagram with an image height of 0.000 mm according to the present invention in the second embodiment.
Figure 2I:
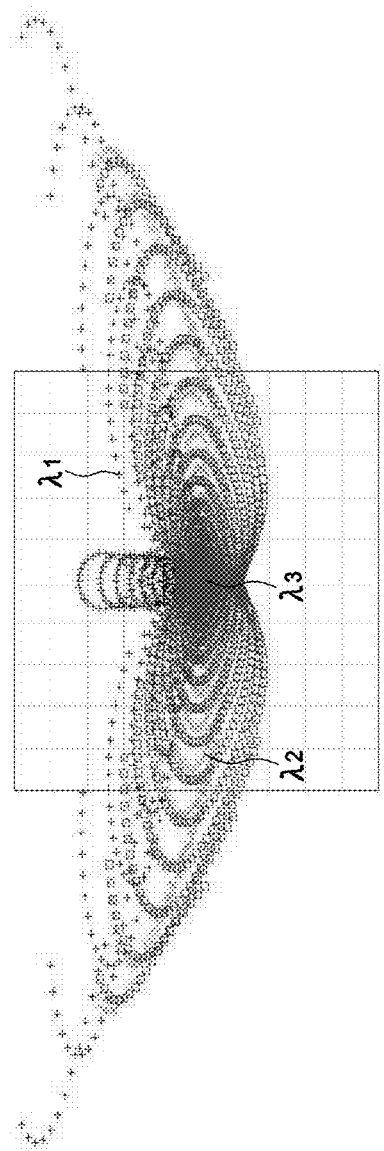
FIG. 2I is a spot diagram with an image height of 7.804 mm according to the present invention in the second embodiment.

With structures disclosed above, the projection lens 30B has a first wavelength $\lambda_1$ set as 0.460 um, a second wavelength $\lambda_2$ set as 0.545 um and a third wavelength $\lambda_3$ set as 0.620 um; thereby it is able to simulate different transverse ray fan plots as shown in FIGS. 2B-2D and to display images with respective image heights of 0.0000 mm, 5.4620 mm and 7.8030 mm on the image IMA. The transverse aberration of a Y-axis is represented by ey. The pupil height of the Y-axis is represented by py. The transverse aberration of an X-axis is represented by ex. The pupil height of the X-axis is represented by px. The maximum of the transverse aberration of the X-axis and the Y-axis is ±20.000 um and the pupil heights of the X-axis and the Y-axis are in normalized proportion; a maximum field of FIGS. 2E and 2F is 31.800°. FIGS. 2G, 2H and 2I are spot diagrams with different image heights displayed on the image IMA. When the image height is 0.000 mm, the root mean square radius is 2.864 um and the geo radius is 7.106 um. When the image height is 5.462 mm, the root mean square radius is 4.134 um and the geo radius is 24.451 um. When the image height is 7.804 mm, the root mean square radius is 8.510 um and the geo radius is 42.360 um. From the data above we can learn that the projection lens 30B has a simple structure and requires low costs for manufacturing with fine image quality.

Figure 3A:
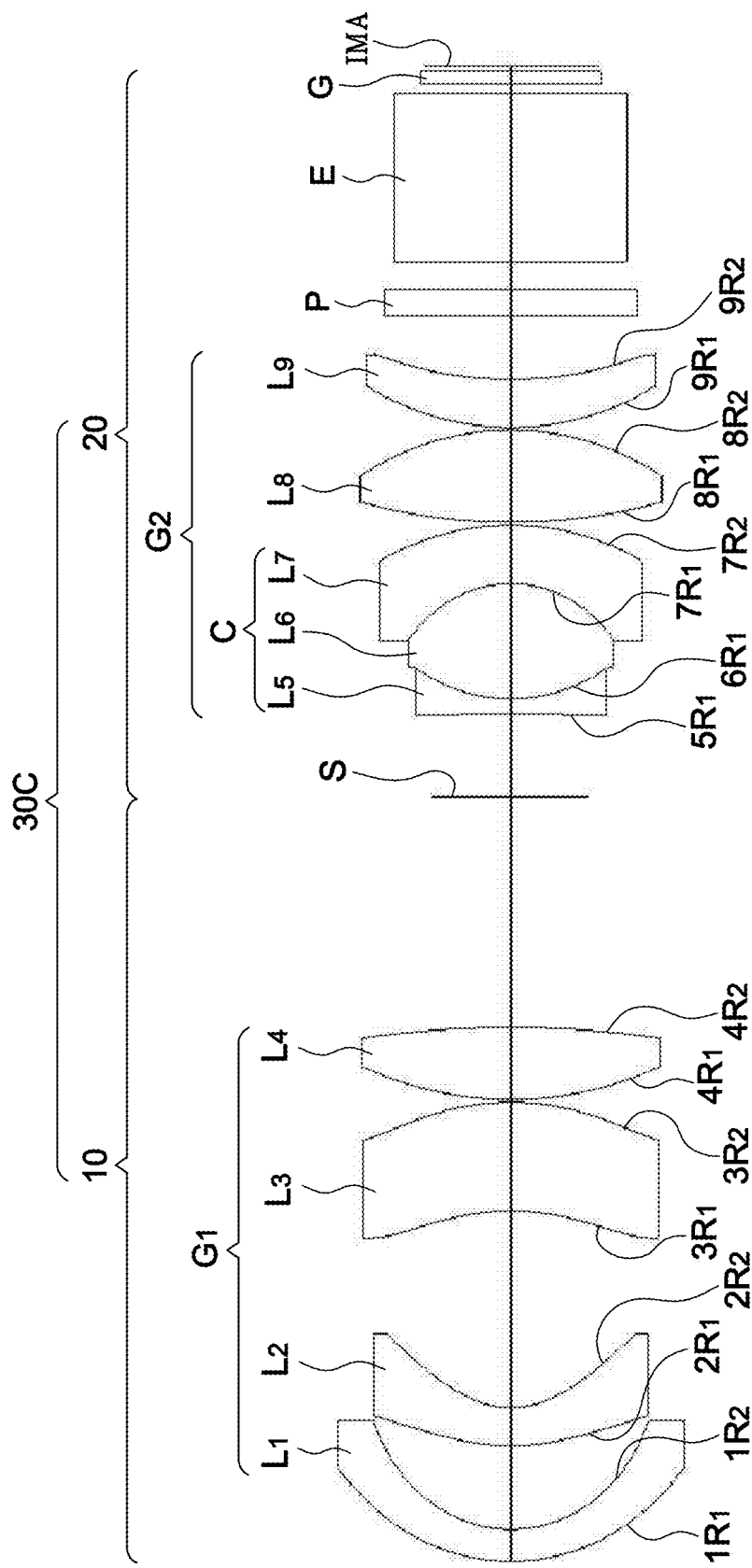
FIG. 3A is a schematic diagram illustrating lenses arrangement of the present invention in a third embodiment.

Further referring to FIG. 3A, in the first embodiment the first lens $L_1$, the second lens $L_2$, the third lens $L_3$, the fourth lens $L_4$, the fifth lens $L_5$, a sixth lens $L_6$, a seventh lens $L_7$, the eighth lens $L_8$ and the last lens $L_9$ of the projection lens 30C each has a radius on each surface, a thickness, refraction rate and an abbe number according to the following specification:

| Surface no. | Radius (mm) | Thickness (mm) | Refraction rate | Abbe number |
|---|---|---|---|---|
| $1R_1$ | 19.88 | 2.50 | 1.84 | 23.7 |
| $1R_2$ | 13.08 | | | |
| $2R_1$ | 20.61 | 3.00 | 1.53 | 56.3 |
| $2R_2$ | 8.68 | | | |
| $3R_1$ | -23.93 | 8.51 | 1.53 | 56.3 |
| $3R_2$ | -24.64 | | | |
| $4R_1$ | 35.33 | 5.65 | 1.80 | 34.9 |
| $4R_2$ | -101.35 | | | |
| S | Infinity | | | |
| $5R_1$ | -695.01 | 1.20 | 1.80 | 25.4 |
| $6R_1$ | 16.13 | 9.03 | 1.49 | 81.6 |
| $7R_1$ | -11.70 | 4.58 | 1.75 | 27.5 |
| $7R_2$ | -25.75 | | | |
| $8R_1$ | 56.95 | 7.23 | 1.49 | 81.6 |
| $8R_2$ | -27.02 | | | |
| $9R_1$ | 27.06 | 3.75 | 1.92 | 18.90 |
| $9R_2$ | 37.60 | | | |

In the table above, the $1R_1$ is the projecting surface of the first lens $L_1$ and the $1R_2$ is the image inputting surface of the first lens $L_1$. The $2R_1$ is the projecting surface of the second lens $L_2$ and the $2R_2$ is the image inputting surface of the second lens $L_2$. The $3R_1$ is the projecting surface of the third lens $L_3$ and the $3R_2$ is the image inputting surface of the third lens $L_3$. The $4R_1$ is the projecting surface of the fourth lens $L_4$ and the $4R_2$ is the image inputting surface of the fourth lens $L_4$. The $5R_1$ is the projecting surface of the fifth lens $L_5$. The $6R_1$ is the projecting surface of the sixth lens $L_6$. The $7R_1$ is the projecting surface of the seventh lens $L_7$ and the $7R_2$ is the image inputting surface of the seventh lens $L_7$. The $8R_1$ is the projecting surface of the eighth lens $L_8$ and the $8R_2$ is the image inputting surface of the eighth lens $L_8$. The $9R_1$ is the projecting surface of the last lens $L_9$ and the $9R_2$ is the image inputting surface of the last lens $L_9$.

In addition, the following table displays the radius, the conic value and order aspheric coefficients of the projecting surface $2R_1$ and the image inputting surface $2R_2$ of the second lens $L_2$ as a plastic aspheric lens.

| Aspheric lens | $2R_1$ | $2R_2$ |
|---|---|---|
| Radius | 20.61 | 8.68 |
| Conic | 0.48 | -0.79 |
| 4th | -1.36E-04 | -1.77E-04 |
| 6th | 7.34E-07 | 8.20E-07 |
| 8th | -4.03E-09 | -5.40E-09 |
| 10th | 1.34E-11 | 1.80E-11 |
| 12th | -2.75E-14 | -6.17E-14 |
| 14th | 0.00E+00 | 0.00E+00 |

In addition, the following table displays the radius, the conic value and order aspheric coefficients of the projecting surface $3R_1$ and the image inputting surface $3R_2$ of the third lens $L_3$ as a plastic aspheric lens.

| Aspheric lens | $4R_1$ | $4R_2$ |
|---|---|---|
| Radius | -23.93 | -24.64 |
| Conic | -7.46 | -2.70 |
| 4th | -4.31E-05 | -9.59E-06 |
| 6th | 3.88E-07 | 3.24E-08 |
| 8th | -8.10E-10 | 4.01E-10 |
| 10th | 8.20E-12 | -1.33E-12 |
| 12th | -2.51E-14 | 5.23E-15 |

In this embodiment, the third lens $L_3$ is a meniscus lens with a focal length longer than 300 mm when being positive or shorter than -300 mm when being negative. The second group of lens $G_2$ includes at least one triplet lens C having dioptric values arranged as negative-positive-negative. But the present invention is not limited to such application.

Figure 3G:
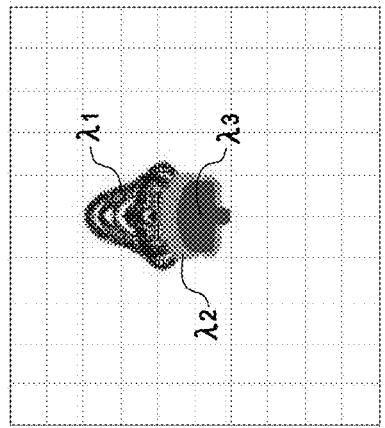
FIG. 3G is a spot diagram with an image height of 0.000 mm according to the present invention in the third embodiment.
Figure 3H:
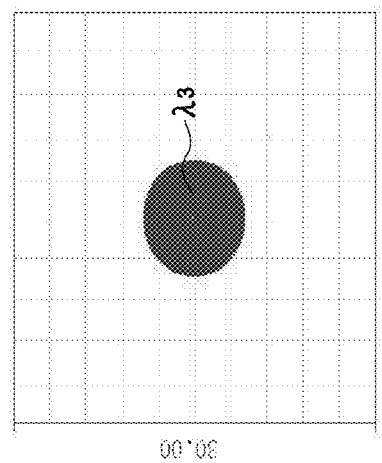
FIG. 3H is a spot diagram with an image height of 5.463 mm according to the present invention in the third embodiment.
Figure 3I:
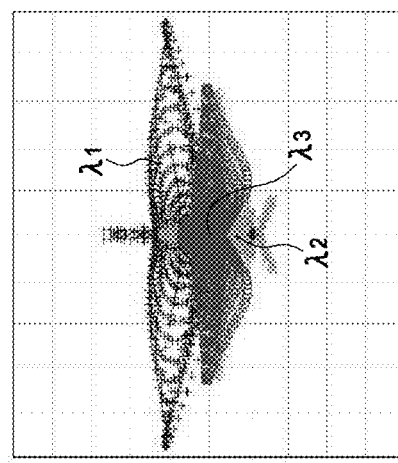
FIG. 3I is a spot diagram with an image height of 7.804 mm according to the present invention in the third embodiment.

With structures disclosed above, the projection lens 30C has a first wavelength $\lambda_1$ set as 0.460 um, a second wavelength $\lambda_2$ set as 0.545 um and a third wavelength $\lambda_3$ set as 0.620 um; thereby it is able to simulate different transverse ray fan plots as shown in FIGS. 3B-3D and to display images with respective image heights of 0.0000 mm, 5.4620 mm and 7.8030 mm on the image IMA. The transverse aberration of a Y-axis is represented by ey. The pupil height of the Y-axis is represented by py. The transverse aberration of an X-axis is represented by ex. The pupil height of the X-axis is represented by px. The maximum of the transverse aberration of the X-axis and the Y-axis is ±20.000 um and the pupil heights of the X-axis and the Y-axis are in normalized proportion; a maximum field of FIGS. 3E and 3F is 31.710°. FIGS. 3G, 3H and 3I are spot diagrams with different image heights displayed on the image IMA. When the image height is 0.000 mm, the root mean square radius is 2.073 um and the geo radius is 3.928 um. When the image height is 5.462 mm, the root mean square radius is 2.216 um and the geo radius is 8.737 um. When the image height is 7.804 mm, the root mean square radius is 3.343 um and the geo radius is 14.738 um. From the data above we can learn that the projection lens 30C has a simple structure and requires low costs for manufacturing with fine image quality.

Although particular embodiments of the invention have been described in detail for purposes of illustration, various modifications and enhancements may be made without departing from the spirit and scope of the invention. Accordingly, the invention is not to be limited except by the appended claims.

What is claimed is:

1. A projection lens structure, comprising: a first group of lenses; an aperture stop arranged at a rear side of said first group of lens, forming a long-focus lens with a focal length between 30~80 mm; and a second group of lens arranged at a rear side of said aperture stop, forming a short-focus lens with a focal length between 20~30 mm, wherein the first group of lenses includes a first lens, a second lens, a third lens and a fourth lens, said second lens being a plastic aspheric lens wherein the second group of lens includes at least one triplet lens having dioptric values arranged as positive-negative-positive or negative-positive-negative, said triplet lens including a fifth lens, a sixth lens and a seventh lens, said second group of lens further including an eighth lens arranged at a rear side of said triplet lens, at least two of the fifth, sixth, seventh and eighth lens having an abbe number greater than 60.

2. The projection lens structure as claimed in claim 1, wherein the fourth lens is a plastic aspheric lens.

3. The projection lens structure as claimed in claim 2, wherein the second lens is a negative meniscus lens with a focal length between −20~−50 mm or a focal length between −25~−40 mm.

4. The projection lens structure as claimed in claim 2, wherein the fourth lens is a meniscus lens with a focal length longer than 300 mm when being positive or shorter than −300 mm when being negative.

5. The projection lens structure as claimed in claim 2, wherein the first lens has an abbe number greater than 60.

6. The projection lens structure as claimed in claim 2, wherein the second group lens further includes a last lens with an abbe number less than 25.

7. The projection lens structure as claimed in claim 1, wherein the aperture stop has an f-number between 1.6~2.0.

8. The projection lens structure as claimed in claim 1, wherein the third lens is a plastic aspheric lens.

9. The projection lens structure as claimed in claim 8, wherein the third lens is a meniscus lens with a focal length longer than 300 mm when being positive or shorter than −300 mm when being negative.

10. A projection lens structure, comprising:
a first group of lens including a first lens, a second lens, a third lens and a fourth lens, said second being negative and being a plastic aspheric lens in a meniscus shape with a focal length between −25~−50 mm;
an aperture stop having an f-number between 1.6~2.0 and arranged at a rear side of said first group of lens, forming a long-focus lens with a focal length between 30~80 mm; and
a second group of lens including at least one triplet lens, an eighth lens and a last lens and arranged at a rear side of said aperture stop, forming a short-focus lens with a focal length between 20~30 mm, said triplet lens having dioptric values arranged as positive-negative-positive or negative-positive-negative and including a fifth lens, a sixth lens and a seventh lens, at least two of the fifth, sixth, seventh and eighth lens having an abbe number greater than 60 and said last lens having an abbe number less than 25.

* * * * *